(12) United States Patent
Nakagawa

(10) Patent No.: US 8,712,568 B2
(45) Date of Patent: Apr. 29, 2014

(54) SUBSTRATE PROCESSING APPARATUS AND DISPLAY METHOD OF SUBSTRATE PROCESSING APPARATUS

(75) Inventor: Yoshihiko Nakagawa, Toyama (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 492 days.

(21) Appl. No.: 12/713,585

(22) Filed: Feb. 26, 2010

(65) Prior Publication Data

US 2011/0055438 A1 Mar. 3, 2011

(30) Foreign Application Priority Data

Aug. 31, 2009 (JP) .................................. 2009-199736

(51) Int. Cl.
*G06F 19/00* (2011.01)
(52) U.S. Cl.
USPC ............. 700/108; 700/121; 438/107; 710/15; 710/17; 710/33; 710/301; 711/115; 715/700; 715/764; 715/769
(58) Field of Classification Search
None
See application file for complete search history.

(56) References Cited

U.S. PATENT DOCUMENTS

| 5,450,326 | A | * | 9/1995 | Black | 700/121 |
| 5,754,451 | A | * | 5/1998 | Williams | 702/185 |
| 5,862,054 | A | * | 1/1999 | Li | 700/121 |
| 5,867,389 | A | * | 2/1999 | Hamada et al. | 700/121 |
| 6,097,204 | A | * | 8/2000 | Tanaka et al. | 324/757.03 |
| 6,122,556 | A | * | 9/2000 | Tochiori et al. | 700/17 |
| 6,415,193 | B1 | * | 7/2002 | Betawar et al. | 700/97 |
| 6,438,441 | B1 | * | 8/2002 | Jang et al. | 700/121 |
| 6,459,949 | B1 | * | 10/2002 | Black et al. | 700/121 |
| 6,493,600 | B1 | * | 12/2002 | Kotoku | 700/121 |
| 6,728,590 | B1 | * | 4/2004 | Dean | 700/121 |
| 6,735,493 | B1 | * | 5/2004 | Chou et al. | 700/121 |
| 6,766,212 | B1 | * | 7/2004 | Dean | 700/121 |
| 6,954,711 | B2 | * | 10/2005 | Beinglass et al. | 702/120 |
| 6,993,404 | B2 | * | 1/2006 | Lev-Ami et al. | 700/109 |

(Continued)

FOREIGN PATENT DOCUMENTS

| CN | 101256408 | 9/2008 | |
| JP | 3-92922 | 4/1991 | ............... G06F 3/06 |

(Continued)

OTHER PUBLICATIONS

'Managing Devices' from Microsoft TechNet, Nov. 3, 2005.*

(Continued)

*Primary Examiner* — Steven Snyder
(74) *Attorney, Agent, or Firm* — Brundidge & Stanger, P.C.

(57) ABSTRACT

A substrate processing apparatus gives a user notice to prevent removal of a storage medium and provides a screen for determining whether the storage medium is removable. The apparatus controls display of the screen for manipulating substrate processing information and includes a part to which an external storage device is attached. The screen includes: a title panel displayed at an upper region of the screen; an information panel controlling or monitoring a task; and a navigation panel at a lower region of the screen. When the external storage device is attached to the part, an external storage device remove button is enabled by displaying the remove button on the navigation panel to indicate the external storage device is attached to the part. When the external storage device is not attached to the part, the remove button is disabled by displaying the remove button in a like color as the background.

14 Claims, 9 Drawing Sheets

(56) References Cited

U.S. PATENT DOCUMENTS

| | | | |
|---|---|---|---|
| 7,016,755 B2* | 3/2006 | Abuku | 700/121 |
| 7,373,211 B1* | 5/2008 | Logsdon et al. | 700/99 |
| 7,855,784 B2* | 12/2010 | Okita | 356/237.5 |
| 7,899,778 B1* | 3/2011 | Donaldson et al. | 1/1 |
| 7,908,023 B2* | 3/2011 | Crawford et al. | 700/108 |
| 7,941,234 B2* | 5/2011 | Aihara | 700/83 |
| 8,082,045 B1* | 12/2011 | Ashizawa et al. | 700/17 |
| 8,340,800 B2* | 12/2012 | Cote et al. | 700/110 |
| 8,473,270 B2* | 6/2013 | Pannese et al. | 703/14 |
| 2002/0171763 A1* | 11/2002 | Stecyk et al. | 348/552 |
| 2003/0169291 A1* | 9/2003 | Nakata et al. | 345/753 |
| 2004/0236533 A1* | 11/2004 | Beinglass et al. | 702/120 |
| 2005/0165731 A1* | 7/2005 | Funk | 707/1 |
| 2006/0242362 A1* | 10/2006 | Hanes et al. | 711/115 |
| 2007/0088914 A1* | 4/2007 | Soman et al. | 711/115 |
| 2007/0141730 A1* | 6/2007 | Fujii et al. | 438/5 |
| 2007/0219736 A1* | 9/2007 | Okita | 702/81 |
| 2008/0134974 A1* | 6/2008 | Takahashi et al. | 118/715 |
| 2008/0155447 A1* | 6/2008 | Pannese et al. | 715/772 |
| 2008/0249648 A1* | 10/2008 | Araki | 700/112 |
| 2009/0031948 A1* | 2/2009 | Ito | 118/52 |
| 2009/0056766 A1* | 3/2009 | Nanba | 134/33 |
| 2009/0059217 A1* | 3/2009 | Okita | 356/237.5 |
| 2009/0077316 A1* | 3/2009 | Tetrick | 711/115 |
| 2009/0182447 A1* | 7/2009 | Crawford et al. | 700/105 |
| 2009/0269171 A1* | 10/2009 | Iijima et al. | 414/222.01 |

FOREIGN PATENT DOCUMENTS

| | | | |
|---|---|---|---|
| JP | 2003108274 | 11/2003 | G06F 3/00 |
| JP | 2007243015 | 9/2007 | |
| KR | 1020070048740 | 5/2007 | |
| WO | 2007088872 | 8/2007 | H01L 21/027 |

OTHER PUBLICATIONS

'Why do I get "device . . . cannot be stopped right now" trying to safely remove my USB drive?' by Leo Notenboom from ask-leo.com, Dec. 23, 2007.*

Definition of "dispose" from Dictionary.com.*

"'Safely Remove Hardware' icon missing'—Tech Support Guy Forums, Nov. 2006.*

'Safely Remove Hardware' by Worldstart.com, posts provided on Aug. 18, 2006 and May 7, 2005.*

IT3, Special Edition, USB Memory CD & DVD Utilization Competition 75 in Complete Edition of Special Supplement, Nikkei PB Inc., vol. 13, No. 5, pp. 14-15, May 1, 2008.

Translation of Japanese Office Action dated Aug. 14, 2013 for Japanese Patent Application No. 2009-199736, pp. 1-4.

"Managing Devices", Microsoft TechNet Library, 2005.

"Why do I get 'device . . . cannot be stopped right now' trying to safely remove my USB drive?", Ask Leo!, 2007.

* cited by examiner

EVENT PROCESSING PROCESS (S10)

TIMER PROCESSING PROCESS (S20)

Fig. 7

| No. | DATA & TIME | ALARM ID | ALARM NAME |
|---|---|---|---|
| 1 | 02/02/2009 13:42:15 | 070007 | INITIALIZATION FAILURE |
| 2 | 02/02/2009 13:41:47 | 000061 | COMMUNICATION FAILURE |
| 3 | 02/02/2009 13:41:43 | 000603 | N2 PURGE COMMAND REQUEST FAILURE |
| 4 | 02/02/2009 13:31:34 | 000061 | COMMUNICATION FAILURE |
| 9 | 02/02/2009 10:16:36 | 070007 | INITIALIZATION FAILURE |
| 10 | 02/02/2009 10:13:41 | 012881 | ABNORMAL SHUTDOWN DETECTED |
| 11 | 02/02/2009 10:13:41 | 000064 | COMMUNICATION FAILURE |
| 12 | 02/02/2009 10:13:41 | 000054 | LINE CUTOFF |

SUBSTRATE PROCESSING APPARATUS AND DISPLAY METHOD OF SUBSTRATE PROCESSING APPARATUS

CROSS-REFERENCE TO RELATED PATENT APPLICATION

This U.S. non-provisional patent application claims priority under 35 U.S.C. §119 of Japanese Patent Application No. 2009-199736, filed on Aug. 31, 2009, in the Japanese Patent Office, the entire contents of which are hereby incorporated by reference.

BACKGROUND OF THE INVENTION

1. Field of the Invention

The present invention relates to a substrate processing apparatus configured to process a substrate such as a semiconductor substrate and a glass substrate, and a display method for a substrate processing apparatus.

2. Description of the Prior Art

In a conventional substrate processing apparatus such as a semiconductor manufacturing apparatus, a medium such as a floppy disk (registered trademark) is used as an external storage medium. Although it is convenient to transfer data using a floppy disk, there is difficulty in transferring a large amount of data using a floppy disk. In addition, it is difficult to perform sufficient data analysis based on a limited amount of data stored in a floppy disk, and it takes time to gather a large amount of data necessary for sufficient data analysis by using a floppy disk.

Recently, a universal serial bus (USB) flash memory is used as an external storage medium for a substrate processing apparatus, and as the capacity of external storage media such as a USB flash memory increases, a large amount of data can be transferred.

Data generated from a substrate processing apparatus are output to a USB flash memory inserted in the substrate processing apparatus. At this time, since data are written from the substrate processing apparatus to the USB flash memory in a delayed manner by using a cache memory, if the USB flash memory is pulled out during writing, data stored in the USB flash memory can be destroyed. Moreover, delayed writing timing is varied according to the situations in the substrate processing apparatus (for example, according to the current task of the substrate processing apparatus). In the case of an ordinary personal computer (PC), by selecting ⌈Safe To Remove Hardware⌋ icon from the taskbar of Window (registered trademark), it can be check whether writing is currently carried out or not. However, a function icon for checking data (information) writing states is not displayed on a manipulation screen of a substrate processing apparatus. Therefore, although data are being written to a USB flash memory, the USB flash memory can be treated like a floppy disk and thus carelessly removed.

SUMMARY OF THE INVENTION

An object of the present invention is to provide a substrate processing apparatus capable of giving notice to a user to prevent an improper removal of a removable storage medium and providing a manipulation screen through which it can be determined whether a removable storage medium can be safely removed.

According to an aspect of the present invention, there is provided a substrate processing apparatus including: a controller configured to control display of a manipulation screen through which substrate processing information is manipulated; and an attachment/detachment part to which a removable external storage device is attached, wherein the manipulation screen includes an initial screen with at least a login button, a login screen displaying an authentication operation when the login button is pressed, a setup screen displayed when the authentication operation is performed and a maintenance screen displayed when a setup button is pressed, wherein, when the setup screen for writing the substrate processing information in the external storage device is displayed by pressing a predetermined button displayed on the maintenance screen, the controller lists the substrate processing information on the setup screen and displays a button indicating the external storage device is attached to the attachment/detachment part on the manipulation screen, when the external storage device is not attached to the attachment/detachment part, the controller disables the a button indicating the external storage device is attached to the attachment/detachment part, when the external storage device is attached to the attachment/detachment part, the controller enables a button indicating the external storage device is attached to the attachment/detachment part, and when the substrate processing information displayed on the setup screen is selected, the controller outputs a selected substrate processing information to the external storage device.

BRIEF DESCRIPTION OF THE DRAWINGS

FIG. 7 is a view illustrating an example of a failure information list screen.

DETAILED DESCRIPTION OF THE PREFERRED EMBODIMENTS

Embodiments of the present invention will be described hereinafter with reference to the attached drawings.

Figure 1A:
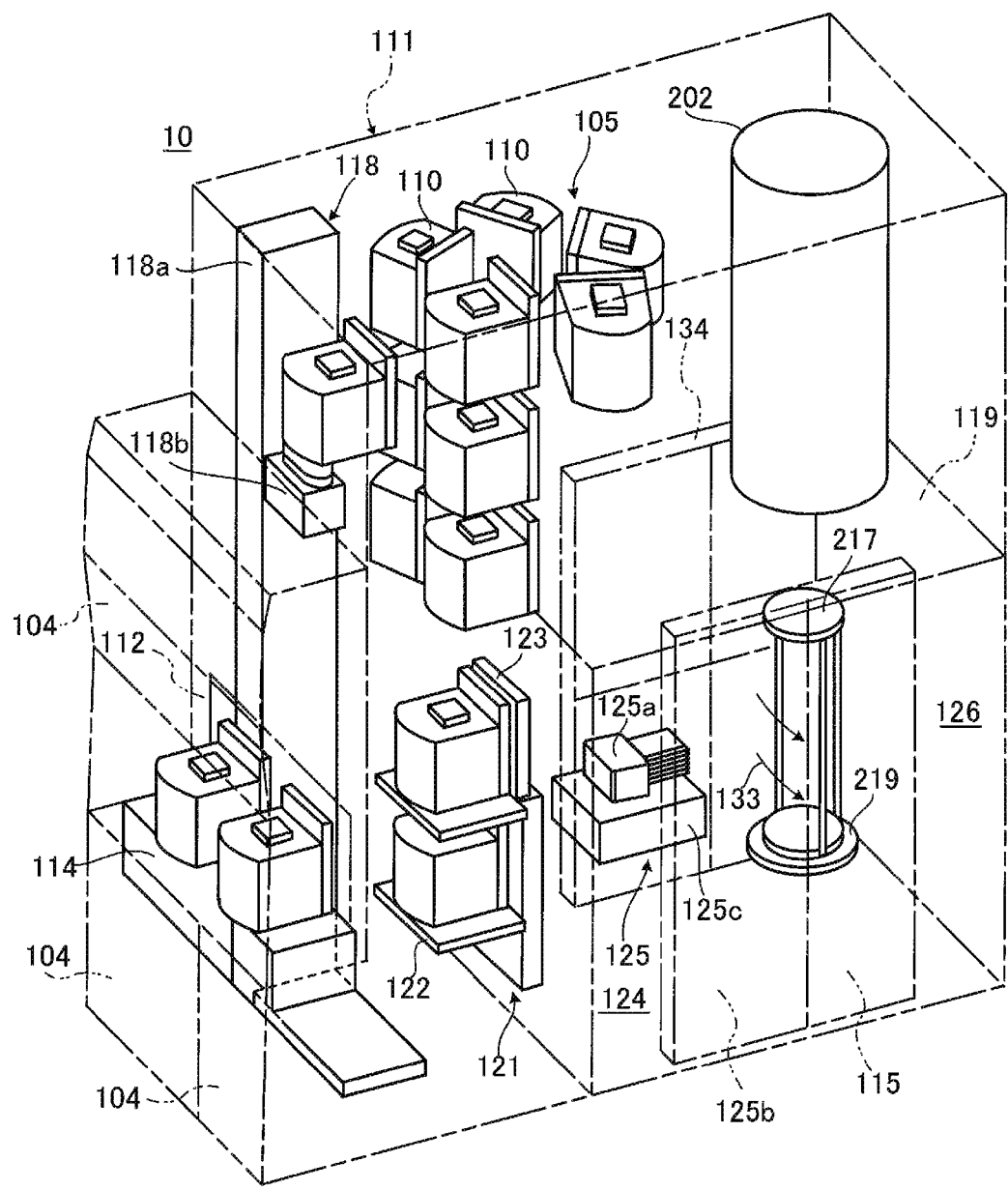
FIG. 1A is a perspective view illustrating a substrate processing apparatus according to an embodiment of the present invention.
Figure 1B:
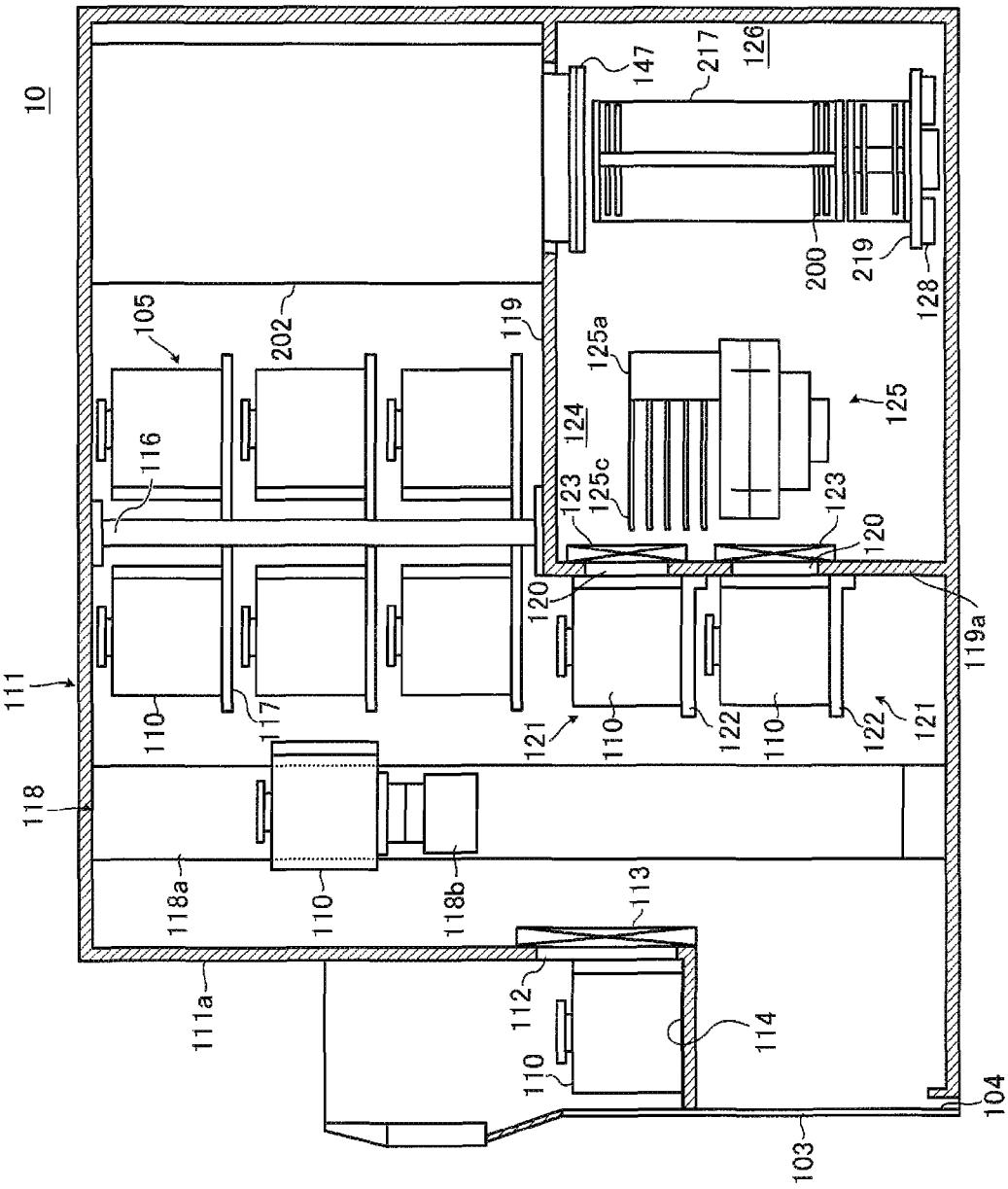
FIG. 1B is a sectional view illustrating the substrate processing apparatus according to an embodiment of the present invention.

FIG. 1A is a perspective view illustrating a substrate processing apparatus 10. FIG. 1B is a cutaway view illustrating the substrate processing apparatus 10.

The substrate processing apparatus 10 is configured to process wafers 200 which are made of silicon and used as substrates.

As shown in FIG. 1A and FIG. 1B, in the substrate processing apparatus 10, front opening unified pods (FOUPs, substrate containers, hereinafter referred to as pods) 110 are used as wafer carriers accommodating wafers 200. The substrate processing apparatus 10 includes a substrate processing apparatus main body 111.

At the front side of a front wall 111a of the substrate processing apparatus main body 111, front maintenance entrances 103 are formed as openings for maintenance works, and front maintenance doors 104 are respectively installed at the front maintenance entrances 103 for closing and opening the front maintenance entrances 103. Although not shown, an auxiliary manipulation device 50 (refer to FIG. 1C) is installed near the upper front maintenance door 104 as an auxiliary manipulation unit.

At the front wall 111a of the substrate processing apparatus main body 111, a pod carrying entrance (substrate container carrying entrance) 112 is formed to connect the inside and outside of the substrate processing apparatus main body 111, and the pod carrying entrance 112 is configured to be opened and closed by a front shutter (substrate container carrying entrance opening/closing mechanism) 113.

At the front side of the pod carrying entrance 112, a load port (substrate container stage) 114 is installed, and the load port 114 is configured such that pods 110 placed on the load port 114 can be adjusted in position. The pods 110 are configured to be carried onto and away from the load port 114 by an in-process carrying device (not shown).

Near the upper center part of the inside of the substrate processing apparatus main body 111 in a front-to-back direction, a rotatable pod shelf (substrate container shelf) 105 is installed, and a plurality of pods 110 can be stored on the rotatable pod shelf 105. The rotatable pod shelf 105 includes a pillar 116 which is vertically installed and intermittently rotatable on a horizontal plane, and a plurality of shelf plates (substrate container stages) 117 which are radially supported at upper, middle, and lower positions of the pillar 116. The plurality of shelf plates 117 are configured such that a plurality of pods 110 can be placed and stored on each of the plurality of shelf plates 117.

At the inside of the substrate processing apparatus main body 111 between the load port 114 and the rotatable pod shelf 105, a pod carrying device (substrate container carrying device) 118 is installed. The pod carrying device 118 includes a pod elevator (substrate container elevating mechanism) 118a capable of moving upward and downward while holding a pod 110, and a pod carrying mechanism (substrate container carrying mechanism) 118b used as a carrying mechanism. The pod carrying device 118 is configured such that a pod 110 can be carried among the load port 114, the rotatable pod shelf 105, and pod openers (substrate container cover opening/closing mechanism) 121 by continuous operations of the pod elevator 118a and the pod carrying mechanism 118b.

At the lower center part inside the substrate processing apparatus main body 111 in the front-to-back direction, a sub case 119 is installed in a manner such that the sub case 119 extends to the rear part of the substrate processing apparatus main body 111. In order to carry wafers 200 into and out of the sub case 119, a pair of wafer carrying entrances (substrate carrying entrances) 120 are formed at a front wall 119a of the sub case 119 in a manner such that the wafer carrying entrances 120 are vertically arranged in two stages. At the upper and lower wafer carrying entrances 120, the pod openers 121 are installed as a pair, respectively. Each of the pod openers 121 includes a stage 122 configured to receive a pod 110 thereon, and a cap attachment/detachment mechanism (cover attachment/detachment mechanism) 123 configured to attach and detach a cap (cover) of the pod 110. Each of the pod openers 121 is configured such that a cap of a pod 110 placed on the stage 122 can be detached and attached by the cap attachment/detachment mechanism 123 for opening and closing a wafer entrance of the pod 110.

The sub case 119 forms a transfer chamber 124 which is fluidically isolated from a space where the pod carrying device 118 and the rotatable pod shelf 105 are installed. At the front region of the transfer chamber 124, a wafer transfer mechanism (substrate transfer mechanism) 125 is installed as a carrying system. The wafer transfer mechanism 125 includes a wafer transfer device (substrate transfer device) 125a capable of rotating or straightly moving wafers 200 on a horizontal plane, and a wafer transfer device elevator (substrate transfer device elevator) 125b capable of moving the wafer transfer device 125a upward and downward. As shown schematically in FIG. 1A, the wafer transfer device elevator 125b is installed between the right end part of the pressure-resistant substrate processing apparatus main body 111 and the right end part of the front region of the transfer chamber 124 of the sub case 119. By continuously operating the wafer transfer device elevator 125b and the wafer transfer device 125a, and using tweezers (substrate holder) 125c of the wafer transfer device 125a as wafer placement parts, wafers 200 can be charged into a substrate holding tool such as a boat 217 (wafer charging) or discharged from the boat 217 (wafer discharging).

In the rear region of the transfer chamber 124, a standby section 126 is provided for accommodating the boat 217 in standby state. At the upper side of the standby section 126, a process furnace 202 is installed. The bottom side of the process furnace 202 is configured to be opened and closed by a furnace port shutter (furnace port opening/closing mechanism) 147.

As shown schematically in FIG. 1A, between the right end part of the pressure-resistant substrate processing apparatus main body 111 and the right end part of the standby section 126 of the sub case 119, a boat elevator (substrate holding tool elevating mechanisms) 115 is installed to lift and lower the boat 217. A connecting tool such as an arm 128 is connected to an elevator base of the boat elevator 115, and a cover such a seal cap 219 is horizontally attached to the arm 128. The seal cap 219 is configured to support the boat 217 vertically and seal the bottom side of the process furnace 202.

The boat 217 includes a plurality of holding members and is configured to hold a plurality of wafers 200 (for example, about fifty to one hundred twenty five wafers 200) in a state where the wafers 200 are horizontally oriented and vertically arranged with centers of the wafers 200 being aligned with each other.

As shown schematically in FIG. 1A, at the left end part of the transfer chamber 124 opposite to the wafer transfer device elevator 125b and the boat elevator 115, a cleaning unit 134 configured by a supply fan and a dust filter is installed so as to supply cleaned atmosphere or inert gas as clean air 133. Between the wafer transfer device 125a and the cleaning unit 134, a notch alignment device (not shown) is installed as a substrate matching device for aligning the circumferences of wafers.

Clean air 133 blown from the cleaning unit 134 flows around the notch alignment device (not shown), the wafer transfer device 125a, and the boat 217 disposed at the standby section 126. Then, the air 133 is sucked through a duct (not shown) toward the outside of the substrate processing apparatus main body 111, or the air 133 is circulated back to a suction side of the cleaning unit 134, that is, a primary side (supply side) of the cleaning unit 134, so as to be blown back to the transfer chamber 124 by the cleaning unit 134.

Next, an explanation will be given on an operation of the substrate processing apparatus 10 of the present invention.

As shown in FIG. 1A and FIG. 1B, when a pod 110 is supplied to the load port 114, the pod carrying entrance 112 is opened by moving the front shutter 113. Then, the pod 110 is carried into the substrate processing apparatus main body 111 through the pod carrying entrance 112 by the pod carrying device 118.

The pod 110 carried into the substrate processing apparatus main body 111 is automatically carried to a predetermined one of the shelf plates 117 of the rotatable pod shelf 105 by the pod carrying device 118 and is temporarily stored on the shelf plate 117, and then the pod 110 is transferred to the stage 122 of one of the pod openers 121. Alternatively, the pod 110 carried into the substrate processing apparatus main body 111 may be directly transferred to the stage 122 of the pod opener 121. At this time, the wafer carrying entrance 120 of the pod opener 121 is closed by the cap attachment/detachment mechanism 123, and clean air 133 is circulated and filled in the transfer chamber 124. For example, nitrogen gas is filled in the transfer chamber 124 as clean air 133 so as to keep the oxygen concentration of the inside of the transfer chamber 124, for example, at 20 ppm or lower, which is much lower than the oxygen concentration of the inside (ambient atmosphere) of the substrate processing apparatus main body 111.

When the pod 110 is placed on the stage 122, the entrance-side of the pod 110 is pressed by the edge of the wafer carrying entrance 120 of the front wall 119a of the sub case 119, and along with this, the cap of the pod 110 is detached by the cap attachment/detachment mechanism 123, so that the wafer entrance of the pod 110 can be opened.

After the pod 110 is opened by the pod opener 121, wafers 200 are picked up from the pod 110 through the wafer entrance of the pod 110 by the tweezers 125c of the wafer transfer device 125a, and after the orientations of the wafers 200 are aligned by the notch alignment device (not shown), the wafers 200 are carried to the standby section 126 located at the rear side of the transfer chamber 124 and charged into the boat 217 (wafer charging). After the wafer transfer device 125a charges the wafers 200 into the boat 217, the wafer transfer device 125a returns to the pod 110 for charging the next wafers 200 into the boat 217.

While wafers 200 are charged into the boat 217 from the side of one (upper or lower one) of the pod openers 121 by the wafer transfer mechanism 125, another pod 110 is concurrently carried to and placed on the stage 122 of the other (lower or upper one) of the pod openers 121 from the rotatable pod shelf 105 by the pod carrying device 118, and the other pod opener 121 opens the wafer entrance of the other pod 110.

After a predetermined number of wafers 200 are charged into the boat 217, the bottom side of the process furnace 202 closed by the furnace port shutter 147 is opened by moving the furnace port shutter 147. Then, the boat 217 in which the wafers 200 are held is loaded into the process furnace 202 by lifting the seal cap 219 using the boat elevator 115 (boat loading).

After the loading operation, a predetermined process is performed on the wafers 200 disposed in the process furnace 202.

After the process, in the reverse order to the above-described loading order except for the alignment of wafers by the notch alignment device (not shown), the wafers 200 and the pods 110 are carried to the outside of the sub case 119.

Next, with reference to FIG. 1C, an explanation will be given on a hardware structure of and around a main controller 14 of the substrate processing apparatus 10.

Figure 1C:
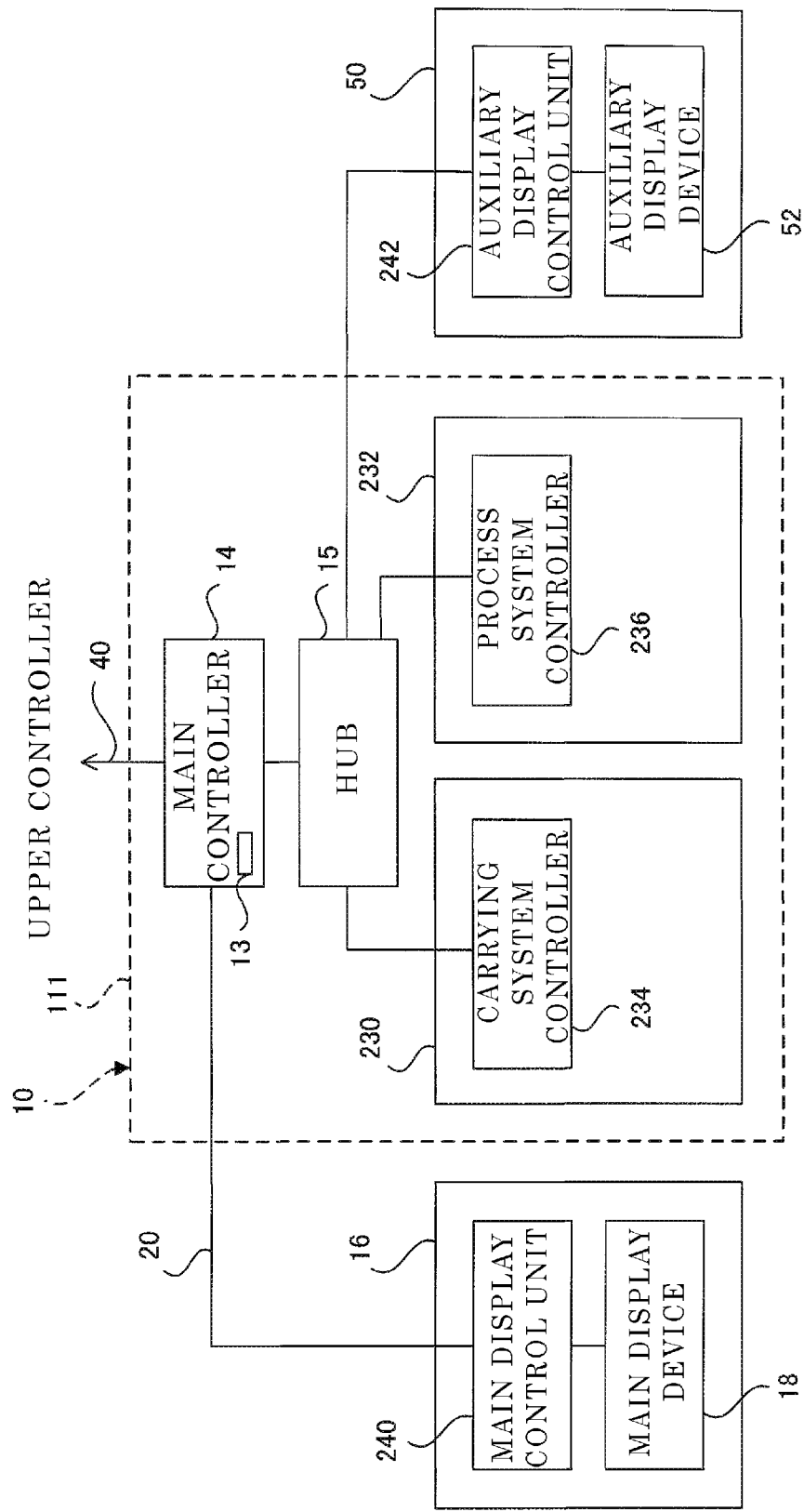
FIG. 1C is a block diagram illustrating an exemplary structure of and around a control unit of the substrate processing apparatus according to an embodiment of the present invention.

As shown in FIG. 1C, in the substrate processing apparatus main body 111 of the substrate processing apparatus 10, the main controller 14, a switching hub 15, a carrying control unit 230, and a process control unit 232 are installed. Instead of installing the carrying control unit 230 and the process control unit 232 inside the substrate processing apparatus main body 111, the carrying control unit 230 and the process control unit 232 may be installed outside the substrate processing apparatus main body 111.

The main controller 14 which is a main control unit is connected to a main manipulation device 16 which is a main manipulation unit, for example, through a video cable 20. Instead of connecting the main controller 14 to the main manipulation device 16 through the video cable 20, the main controller 14 and the main manipulation device 16 may be connected through a communication network 40.

In addition, the main controller 14 is connected to an external manipulation device (not shown), for example, through the communication network 40. Thus, the external manipulation device can be disposed at a remote place from the substrate processing apparatus 10. For example, when the substrate processing apparatus 10 is installed in a clean room, the external manipulation device can be disposed at a place outside the clean room, such as an office.

An operating system (OS) corresponding to a universal serial bus (USB) port of Windows 2003 server or the like is installed in the main controller 14, such that an external storage device (for example, a USB flash memory) corresponding to the USB port can be inserted in the substrate processing apparatus 10.

The main manipulation device 16 is disposed close to the substrate processing apparatus 10 (or the process furnace 202 and the substrate processing apparatus main body 111). In the current embodiment, the main manipulation device 16 is mounted on the substrate processing apparatus main body 111 so that the main manipulation device 16 can be fixed as an integrated part of the substrate processing apparatus 10

Herein, the sentence "the main manipulation device 16 is disposed close to the substrate processing apparatus 10 (or the process furnace 202 and the substrate processing apparatus main body 111)" means that the main manipulation device 16 is disposed at a place where an operator can check the state of the substrate processing apparatus 10. For example, the main manipulation device 16 may be installed in a clean room where the substrate processing apparatus main body 111 is installed.

The main manipulation device 16 includes a main display device 18. For example, the main display device 18 is a liquid crystal display panel, and a manipulation screen for manipulating the substrate processing apparatus 10 is displayed on the main display device 18. Information, generated from the substrate processing apparatus 10, can be displayed on the manipulation screen and output to a device such as a USB flash memory inserted in the substrate processing apparatus 10.

The auxiliary manipulation device 50 includes an auxiliary display device 52. Like the main display device 18, the auxiliary display device 52 may be a device such as a liquid crystal display panel, and a manipulation screen for manipulating the substrate processing apparatus 10 may be displayed on the auxiliary display device 52. The manipulation screen displayed on the auxiliary display device 52 has the same function as the manipulation screen displayed on the main display device 18. That is, information, generated from the substrate processing apparatus 10, can be displayed on the auxiliary display device 52 and output to a USB flash memory inserted in the substrate processing apparatus 10.

The carrying control unit 230 includes a carrying system controller 234 configured by, for example, a central processing unit (CPU), and the process control unit 232 includes a process system controller 236 configured by, for example, a CPU. The carrying system controller 234 and the process system controller 236 are respectively connected to the main controller 14 through the switching hub 15.

In addition, at the main controller 14, a port 13 is installed as an attachment/detachment part to/from which an external storage device such as a USB flash memory (storage medium) can be attached/detached.

In addition, as shown in FIG. 1C, in the main manipulation device 16, a main display control unit 240 is installed to control a display operation of the main display device 18 or other operations. The main display control unit 240 is connected to the main controller 14, for example, through the video cable 20.

In addition, as shown in FIG. 1C, in the auxiliary manipulation device 50, an auxiliary display control unit 242 is installed to control a display operation of the auxiliary display device 52 or other operations. However, the auxiliary display control unit 242 is not limited to the structure shown in FIG. 1C. For example, the auxiliary display control unit 242 may be connected to the main controller 14 through the communication network 40.

Figure 2:
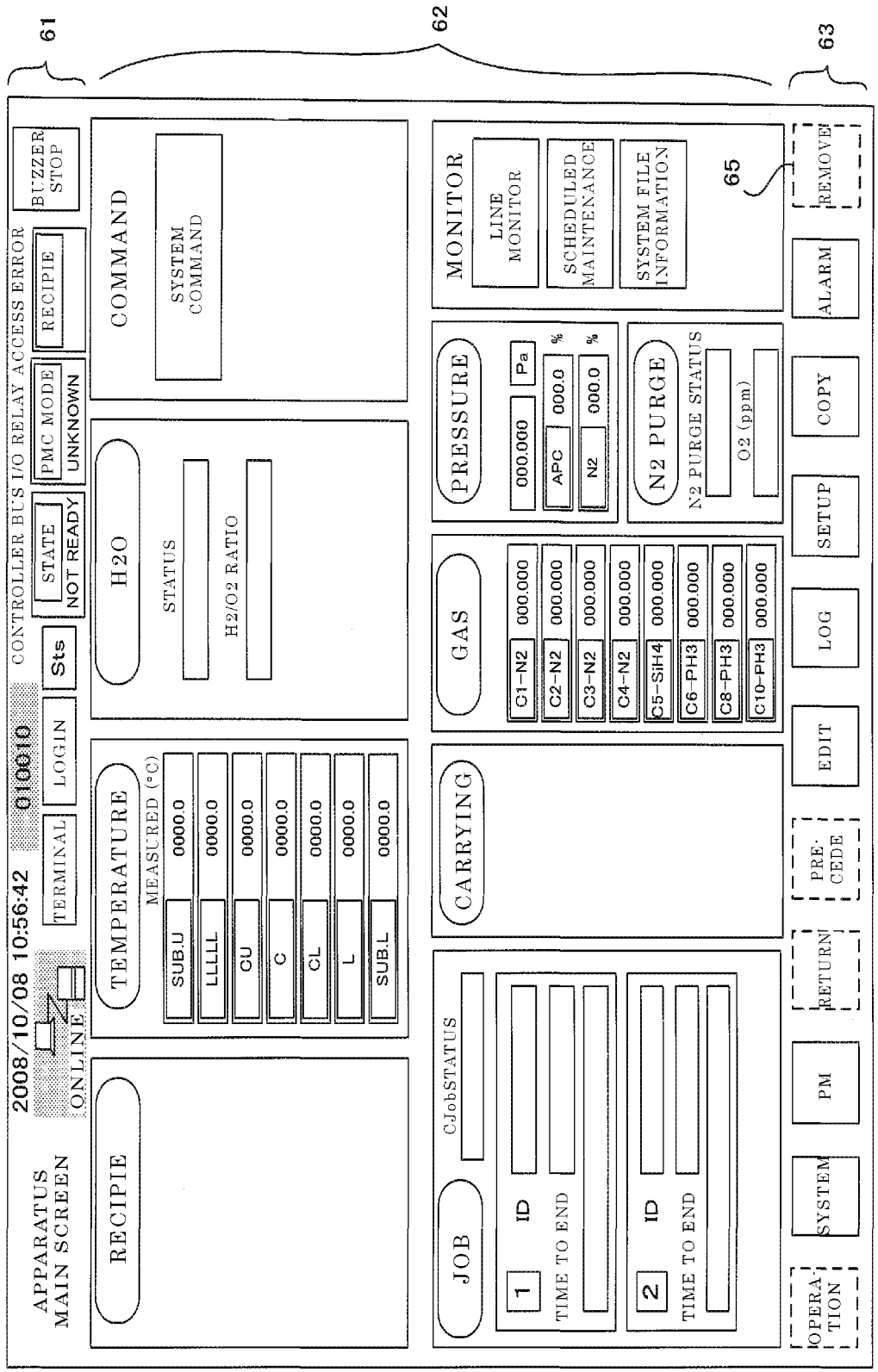
FIG. 2 is a view illustrating an example of a manipulation screen that is first displayed on a main display screen of the substrate processing apparatus, according to an embodiment of the present invention.

FIG. 2 is a view illustrating an example of an initial manipulation screen that is first displayed on the main display device 18 and the auxiliary display device 52.

The manipulation screen includes a title panel 61, an information panel 62, a navigation panel 63, and a command panel (not shown).

The title panel 61 is located at the uppermost region of the manipulation screen above the information panel 62 and the command panel (not shown). The title panel 61 is always displayed, and for example, during an online communication period, communication states with an upper controller, date, time, a login button, a logout button, and an error message are displayed on the title panel 61. In addition, for efficient manipulation, other items may be optionally displayed.

In each functional region of the information panel 62, one or more pieces of information or a graphic screen is displayed. On the information panel 62, graphics or other display objects are disposed for carrying out a necessary controlling or monitoring task. Furthermore, in a functional region of the information panel 62, a plurality of pieces of information may be displayed at one time.

The navigation panel 63 is the lowermost region of the manipulation screen in which various navigation buttons are disposed. Text labels may be attached to the navigation buttons to display the functions of the navigation buttons by images (icons). When a dialog box is displayed on the screen for the purpose of alert or notice, the dialog box is displayed in a manner such that the dialog box is not overlapped with the navigation panel 63. In addition, a user can access a variety of information by manipulating the navigation panel 63. In addition, an information-access button for surely performing a manipulation operation related to apparatus safety is disposed at the navigation panel 63. For example, an alarm button is disposed for checking a generated alarm, an alert, and a currently acquired event log and accessing information for cancelling the alarm or alert. Like the title panel 61, the navigation panel 63 may always be displayed.

In the navigation panel 63, buttons indicated by dashed lines are buttons that cannot be pressed (disabled buttons). According to the contents of the manipulation screen and a user's manipulation, buttons are disabled or enabled. For example, when a user inserts a USB flash memory into the substrate processing apparatus 10, a remove button 65 which is a confirm part for confirming a removal of a device is enabled, and if a user removes the USB flash memory from the substrate processing apparatus 10, the remove button 65 is disabled. If the remove button 65 is provided at the navigation panel 63, an operator can be urged to surely press the remove button 65. Therefore, particularly in the case of a USB flash memory, data destruction or influence on the OS of the main controller 14 can be prevented.

Explanations will now be given on other navigation buttons.

In FIG. 2, a system button of the navigation panel 63 is pressed, and a system main screen is displayed. The system main screen is displayed using colors although colors cannot be distinguished in FIG. 2. In this state, if a PM button is pressed, the screen changes to a PM main screen to display information about the process control unit 232. In addition, an edit button is disposed at the navigation panel 63. If the edit button is pressed, the screen changes to a file list display screen to display editable files. After pressing the edit button, an operator can select a desired file to display and edit the selected file. The editable files are files used for a substrate processing process, such as recipes or tables. If a data log button is pressed, a data log setup screen is displayed, which relates to records (logs) of data such as production information (data) indicating past process states of the apparatus, failure information (failure data) indicating states of the apparatus when a failure occurs, trace data, key logging data, event logging data, and error logging data. If a setup button is pressed, a setup screen is displayed for setup works such as parameter editing or file maintenance. If a copy button is pressed, a manipulation screen displayed at the time the copy button is pressed is copied. If the alarm button is pressed, an alarm monitor screen or a reference screen for referring to failure history information is displayed. In addition, failure information (failure data) indicating states of the apparatus when a failure occurs is also displayed as a reference.

As described above, the current embodiment of the present invention is characterized by the remove button 65 provided at the navigation panel 63 as a confirm part for confirming a removal of a device from the port 13. Here, the term "device" is used as a collective term including output units such as a printer, input units such as a keyboard and a mouse, as well as external storage media such as a USB flash memory.

Figure 3:
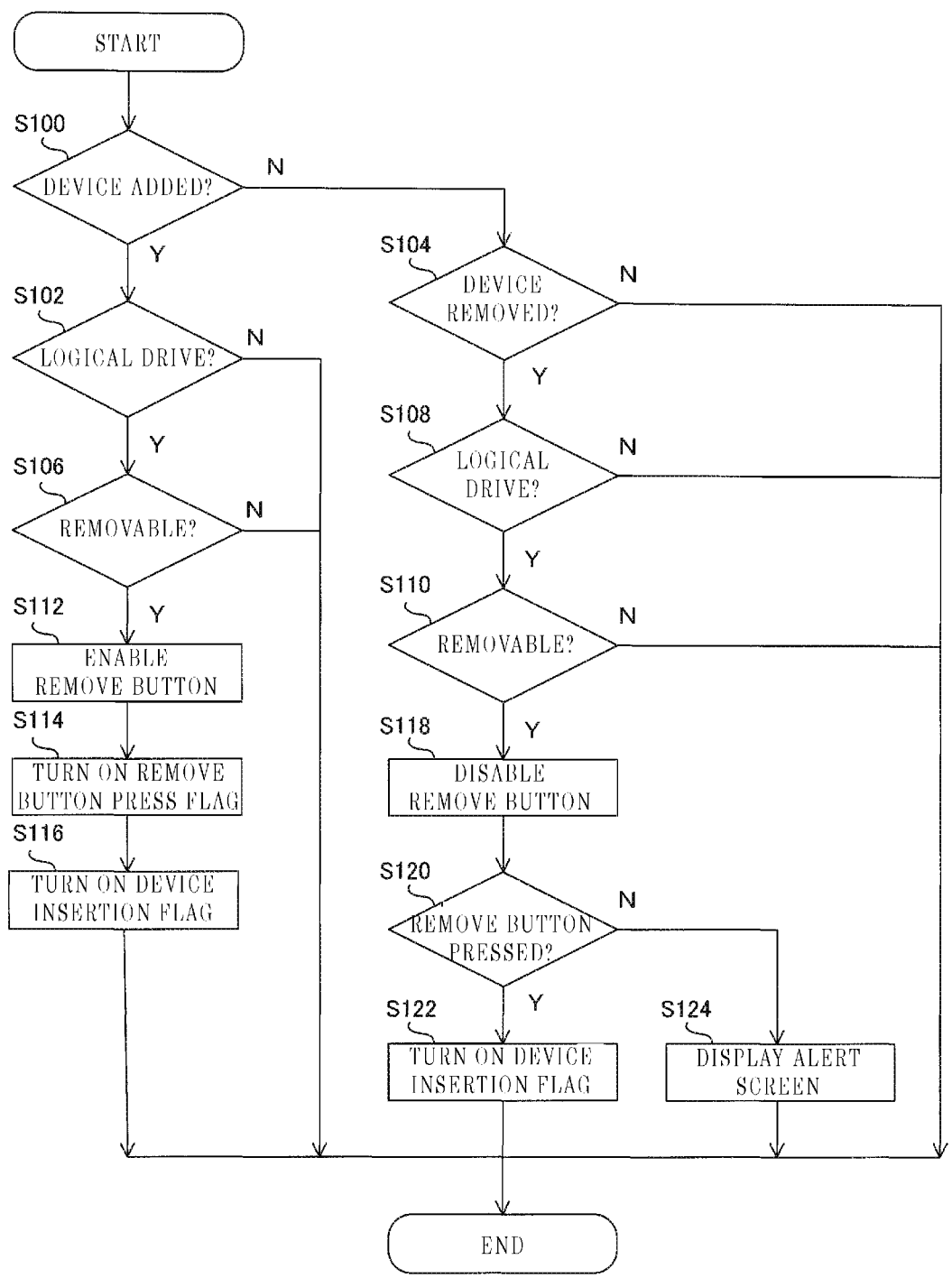
FIG. 3 is a flowchart for explaining an event processing process.

FIG. 3 is a flowchart for explaining an event processing process S10 which is performed by the main controller 14. Here, an event means a device state change, specifically insertion or removal of a device to or from the port 13.

The event processing process is started when a WM_DEVICECHANGE message is transmitted to the main controller 14 as a trigger message according to a device state. The WM_DEVICECHANGE message is a message transmitted when a new device is added and becomes usable or a device is removed in a Windows execution environment, and the WM_DEVICECHANGE message is a data structure including events relating to a device change and detailed information about the device change.

Since event processing is triggered by transmission of a WM_DEVICECHANGE message, the load of the main controller 14 can be reduced as compared with the case where an event is continuously monitored by using, for example, a timer.

As shown in FIG. 3, in step S100, from a received WM_DEVICECHANGE message, it is determined whether there is an event of adding a new device. If an event of adding a new device is generated, the process goes to step S102, and if an event of adding a new device is not generated, the process goes to step S104.

In step S102, it is determined whether the added device is a logical drive. If the added drive is a logical drive, the process goes to step S106, and if the added drive is not a logical drive, the process is terminated.

In step S104, from the WM_DEVICECHANGE message, it is determined whether there is an event of removing a device. If an event of removing a device is generated, the process goes to step S108, and if an event of removing a device is not generated, the process is terminated.

In step S106, it is determined whether the added drive is removable. If the added device is removable, the process goes to step S112, and if the added device is not removable, the process is terminated.

In step S108, the same processing as in step S102 is performed, and in step S110, it is determined that the removed device is a removable device. If the removed device is a removable device, the process goes to step S118, and if the removed device is not removable, the process is terminated.

In step S112, a remove button is enabled, and this is displayed on the main display device 18 and the auxiliary display device 52. Then, the process goes to step S114.

In step S114, a flag (remove button press flag) indicating that the remove button is pressed is turned off.

In step S116, a flag (device insertion flag) indicating that a device is inserted is turned on.

In step S118, the remove button is disabled, and this is displayed on the main display device 18 and the auxiliary display device 52. Then, the process goes to step S120.

In step S120, based on the state of the remove button press flag, it is determined whether the remove button is pressed before an even of removing a device is generated. If the remove button press flag is in on state, the process goes to step S122, and if not, the process goes to step S124.

In step S122, the device insertion flag is turned off.

In step S124, an alert screen is displayed on the main display device 18 and auxiliary display device 52 to urge a user to remove a device after pressing the remove button in the next time he removes a device.

Figure 4:
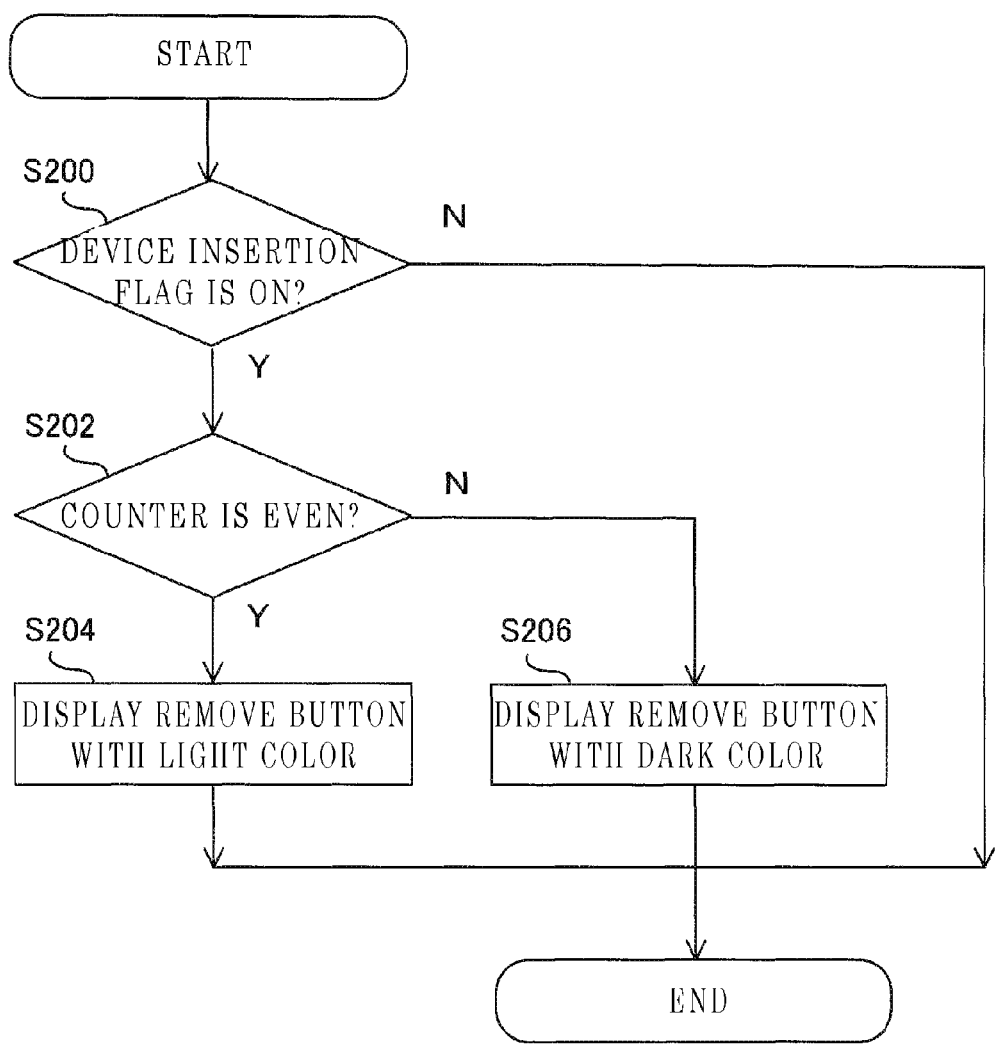
FIG. 4 is a flowchart for explaining a timer processing process.

FIG. 4 is a flowchart for explaining a timer processing process S20 performed by the main controller 14.

As shown in FIG. 4, in step S200, if the device insertion flag is in on state, the process goes to step S202, and if the device insertion flag is not in on state, the process is terminated.

In step S202, it is determined whether a counter of the timer is an even number. If the counter of the timer is an even number, the process goes to step S204, and if the counter of the timer is not an even number, the process goes to step S206.

In step S204, the remove button is set to, for example, a light color and displayed with the set light color, and in step S206, the remove button is set to, for example, a dark color and displayed with the set dark color. That is, the remove button is displayed with alternating light and dark colors (blink display).

Figure 5:
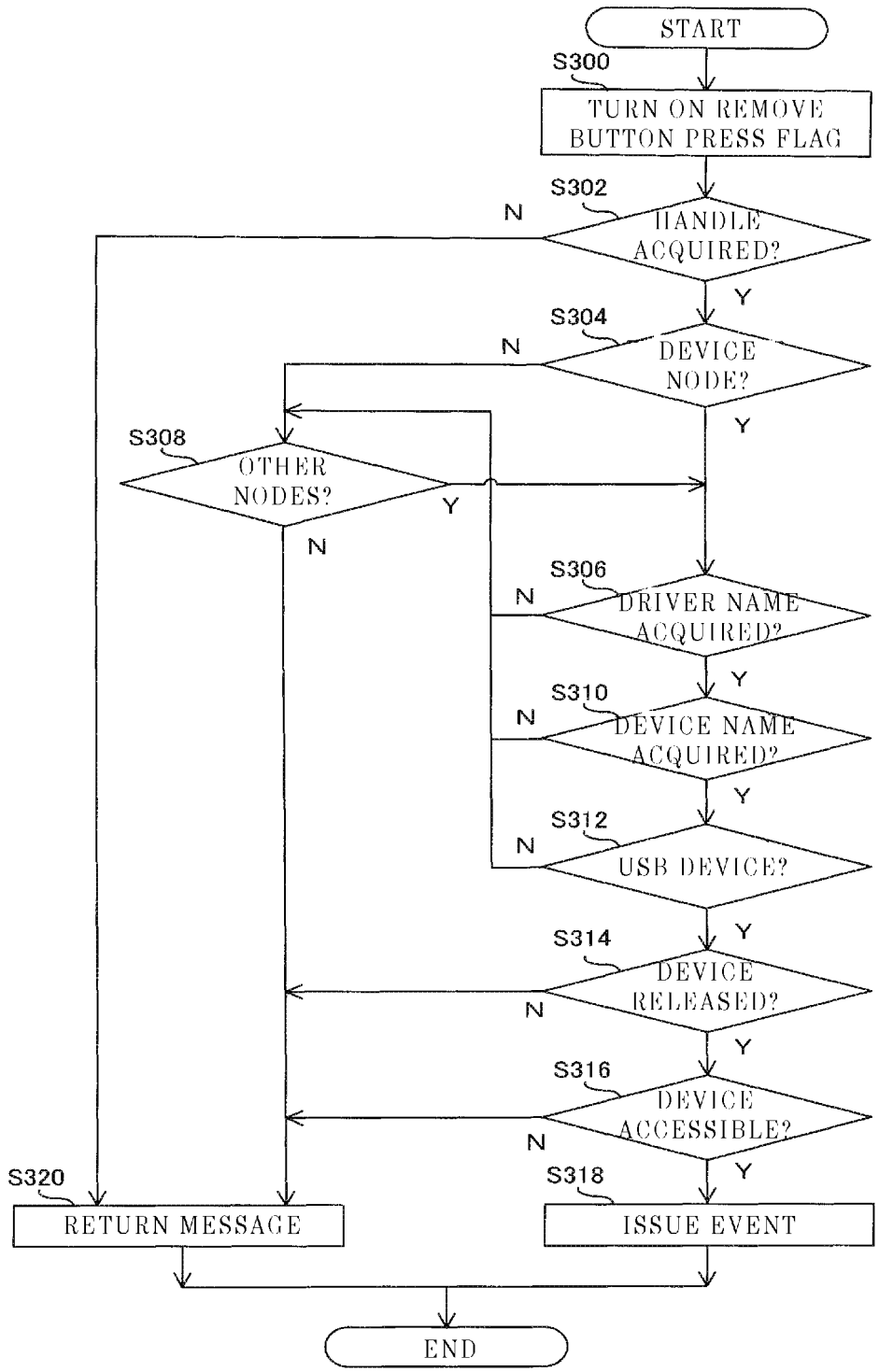
FIG. 5 is a flowchart for explaining a remove button press processing process.

FIG. 5 is a flowchart for explaining a remove button press processing process S30 performed by the main controller 14.

The remove button press processing process is started when the remove button 65 of the manipulation screen is pressed as a trigger.

As shown in FIG. 5, in step S300, the remove button press flag is turned on, and the process goes to step S302.

In step S302, a device instance handle is acquired, and the process goes to step S304. The device instance handle is a unique identifier of a device (for example, a USB flash memory). If the device instance handle cannot be acquired, the process goes to step S320.

In step S304, devices connected to a device corresponding to the device instance handle acquired in step S302 are displayed by a node tree (that is, a device tree is prepared), and it is determined whether there is a device node in the device tree. If there is a device node, the process goes to step S306, and if there is no device node, the process goes to step S308.

In step S306, a driver name of the node tree is acquired, and the process goes to step S310. If a driver name cannot be acquired, the process goes to step S308.

In step S308, the device tree is traced to search for a child node (a deep node), brother nodes (having the same depth), and a parent node (a shallow node). If there is a family node, the process goes to step S306, and if there is no family node, the process goes to step S320.

In step S310, a device name of the node tree is acquired, and the process goes to step S312. If a device name cannot be acquired, the process goes to step S308.

In step S312, it is determined whether the device name acquired in step S310 is 「USB mass storage device」. If so, the process goes to step S314, and if not, the process goes to step S308.

In step S314, a device context corresponding to a device node of the device name acquired in step S310 is released, and the process goes to step S316. The device context means a data structure storing information used as a device node, and the device context is released, for example, by calling an application program interface (API). If the device context cannot be released, the process goes to step S320.

In step S316, it is determined whether a device node corresponding to the device name acquired in step S310 is accessed. If accessed, the process is terminated, and if not accessed, the process goes to step S320.

In step S318, a device remove event is issued, and the process is terminated.

In step S320, an error message is generated as a reply, and the process is terminated. For example, an error message is displayed on an error screen.

Figure 6:
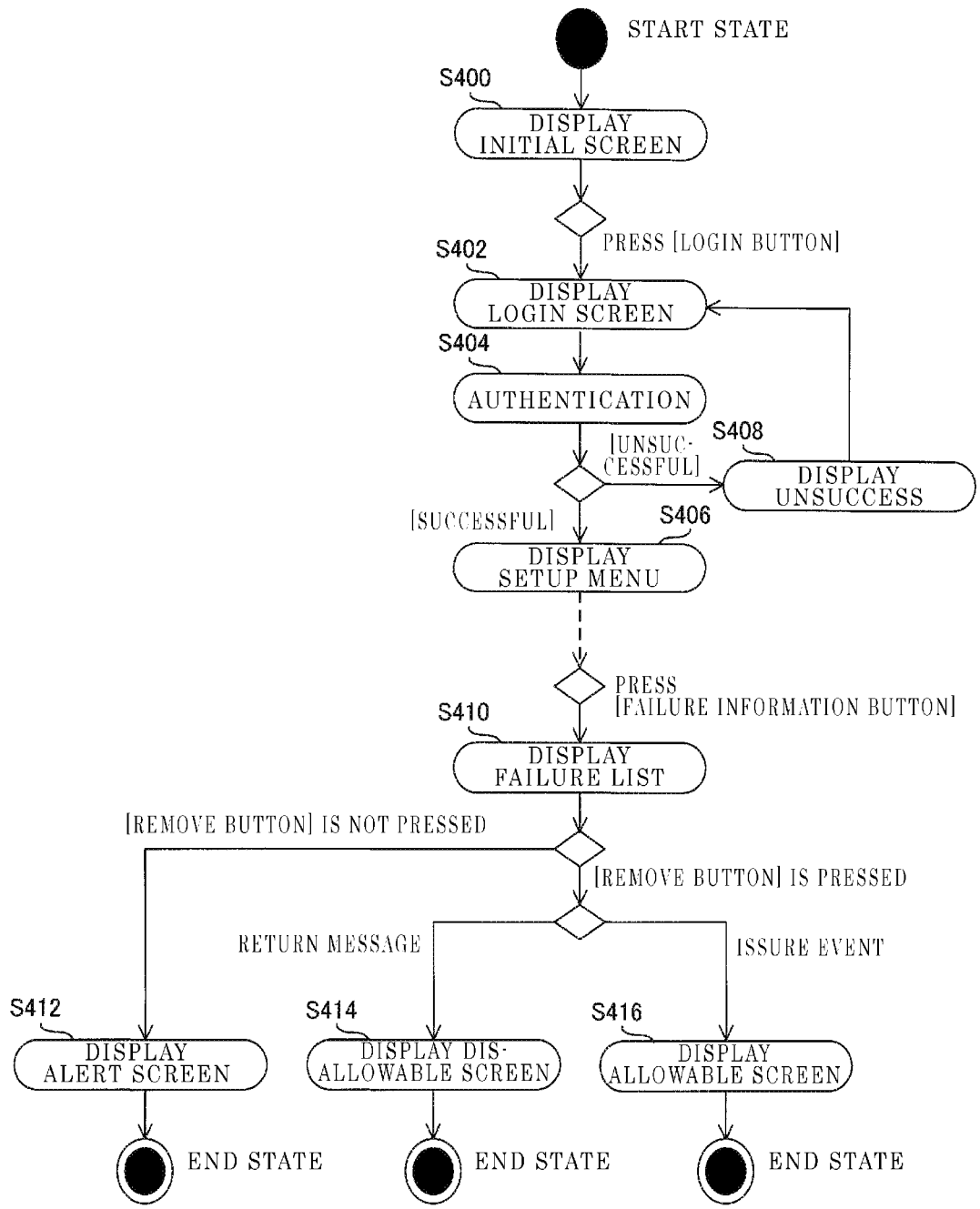
FIG. 6 is an activity view illustrating transition of a manipulation screen.

FIG. 6 is an activity view illustrating transition of a manipulation screen of the main display device 18 or the auxiliary display device 52 illustrated in FIG. 1C when failure information is copied to a USB flash memory.

As shown in FIG. 6, in step S400, an initial screen as shown in FIG. 2 is displayed, and if the login button of the title panel 61 is pressed, the process goes to step S402. Since authentication is necessary to manipulate the substrate processing apparatus 10, the case where any other button than the login button is pressed will not be described.

In step S402, a login screen is displayed to receive login information (for example, user name and password).

In step S404, authentication is carried out based on information input through the login screen. If the authentication is successful, the process goes to step S406, and if the authentication is not successful, the process goes to step s408.

In step S406, if the setup button of the navigation panel 63 is pressed, a maintenance screen is displayed for the substrate processing apparatus 10.

Failure information is stored as a kind of a log file, and for example, if a button of the maintenance screen of the substrate processing apparatus 10 is pressed to request copying of a file or backup and restoration of parameters, a file maintenance screen is displayed. If a file maintenance button is pressed on the file maintenance screen, a file management screen is displayed. Furthermore, a log file list screen is displayed in response to the pressing of a log acquisition process button of the file management screen. If a 「failure information」 button is pressed from the log file list screen to request maintenance for failure information, a failure information list screen (as shown in FIG. 7) is displayed in step S410.

In step S408, an authentication failure screen is displayed to give information about the reason of authentication failure, and the process goes back to step S402.

After failure information is selected from the failure information list screen shown in FIG. 7 and is copied to an USB flash memory, if the USB flash memory is removed without pressing the remove button 65, the process goes to step S412. Meanwhile, when the remove button 65 is pressed, the process goes to step S414 if an error message is returned as a return value of event processing, and the process goes to step S416 if an event is issued as a return value.

In step S414, together with an error message, a remove disallowable screen is displayed to indicate that removal of a USB flash memory is not preferable.

In step S416, a removal allowable screen is displayed to indicate that copying to a USB flash memory is successfully carried out.

In the above description, failure information is output to a USB flash memory. However, such information may be output to other devices corresponding to a USB port. Furthermore, other information generated from the substrate processing apparatus 10 may be output in the same way.

An exemplary embodiment of the present invention will now be described.

An operator of a maker copies data such as past production states of an apparatus (hereinafter referred as production information), states of the apparatus at the time of failures (hereinafter referred to as failure information), and current or past states of the apparatus (hereinafter referred to as trace data) from the apparatus to a USB flash memory so as to analyze the data. Such data as production information, failure information, and trace data are stored as files, and the total size of the files reaches several mega bytes. Therefore, it is difficult to get such large data by using a conventional floppy disk; however, according to the present invention, such large data can be safely obtained for data analysis.

In addition to such production information, failure information, and trace data, other information such as information about keys used to manipulate an apparatus (hereinafter referred to as a key log), information about information exchanges between modules (hereinafter referred to as an event log), and information about errors of program execution (hereinafter referred to as a error log) can be stored in a USB flash memory for data analysis. Therefore, when a failure occurs, the reason of the failure can be found rapidly and easily, and thus downtime of an apparatus can be reduced.

In addition, when a new apparatus is added to form the same kind of films, data such as recipes, tables, and parameters that are necessary for production and maintenance can be safely copied from an existing apparatus to the new apparatus.

In the above-described embodiment, if a device is inserted into the attachment/detachment part 13, the remove button 65 of the navigation panel 63 is automatically enabled. In addition, even when a substrate processing process is carried out, data can be output to a device. However, in another embodiment of the present invention, when the apparatus carries out a substrate processing process, "enabled" may be displayed on the manipulation screen (that is, the remove button 65 may be enabled) so as to receive a manipulation request for copying data to a device.

As described above, if a device is inserted during a substrate processing process, it is preferable that an error message be displayed on the manipulation screen. That is, it is preferable that device insertion timing be monitored. According to the present invention, device insertion timing can be easily monitored by acquiring an event log at the time a device is inserted into or removed from the attachment/detachment part 13 and analyzing the event log.

In the above-described embodiments of the present invention, the substrate processing apparatus 10 is configured as a semiconductor manufacturing apparatus used to perform a semiconductor device (integrated circuits, ICs) manufacturing method. However, the present invention can be applied to other apparatuses such as a liquid crystal display (LCD) apparatus configured to process a glass substrate, as well as semiconductor manufacturing apparatuses.

The substrate processing apparatus 10 may perform film-forming processes such as a chemical vapor deposition (CVD) process, a physical vapor deposition (PVD) process, an oxide film forming process, a nitride film forming process, and a metal-containing film forming process.

In addition, in the above-described embodiments, the substrate processing apparatus 10 is configured as a vertical type substrate processing apparatus. However, the present invention can be applied to a single-wafer type substrate processing apparatus and other apparatuses such as an exposing apparatus, a lithography apparatus, and a coating apparatus.

In addition, the present invention can be applied to a group management apparatus (management server) which is connected to a plurality of substrate processing apparatuses 10 for managing the plurality of substrate processing apparatuses 10, and the present invention can be applied to a substrate processing system including such substrate processing apparatuses and a group management apparatus.

According to the substrate processing apparatus of the present invention, insertion of a removable storage medium to the main controller can be checked through a manipulation screen. In addition, by using the button (remove button) displayed on the manipulation screen to indicate insertion of the storage medium, safety can be checked through the manipulation screen when removing the storage medium. Therefore, a storage medium can be safely removed without damaging data stored in the storage medium.

[Supplementary Note]

Although the present invention is characterized by the appended claims, the present invention also includes the following embodiments.

[Supplementary Note 1]

According to an embodiment of the present invention, there is provided a substrate processing apparatus comprising a controller connected to: a manipulation unit configured to provide a manipulation screen through which a file is prepared or edited to process a substrate; and an attachment/detachment part to which an external storage device is attached to store data generating when the file is executed, the controller being connected to the manipulation unit and the attachment/detachment part through communication lines and being configured to control the file to execute the file, wherein when an external storage device is not attached to the attachment/detachment part, the controller disables a predetermined button of the manipulation screen by displaying the predetermined button with the same color as the color of a background, and when an external storage device is attached to the attachment/detachment part, the controller clearly displays the predetermined button at a position in a manner such that the predetermined button is not replaced even when a predetermined manipulation is carried out on the manipulation screen or a screen switching manipulation is performed to monitor operational states of the substrate processing apparatus while the substrate processing process performs a substrate processing process.

[Supplementary Note 2]

In the substrate processing apparatus of Supplementary Note 1, when the predetermined button is pressed to remove an external storage device from the attachment/detachment part, an error message may be generated if data writing to the external storage device is not completed.

[Supplementary Note 3]

In the substrate processing apparatus of Supplementary Note 1 or 2, the predetermined button may be clearly displayed with a different color while data are being written to an external storage device.

[Supplementary Note 4]

In the substrate processing apparatus of Supplementary Note 1 or 2, the controller may display a setup screen on the manipulation screen to allow data writing from files to an external storage device, and when a predetermined file is selected, the controller may copy data of the selected file to the external storage device.

[Supplementary Note 5]

In the substrate processing apparatus of Supplementary Note 4, the data copied to the external storage device may comprise: at least production information (production data) about past production states of the apparatus; failure information (failure data) about states of the apparatus at the time of failures; trace data; key login data; event login data; and/or error login data.

[Supplementary Note 6]

In the substrate processing apparatus of Supplementary Note 1, when data are written to an external storage device, if a prepared file is not completely written to the external storage device, an error message is generated.

[Supplementary Note 7]

In the substrate processing apparatus of Supplementary Note 1, when data are written to an external storage device, if a prepared file is not completely written to the external storage device, the file is displayed with a color different from other files.

[Supplementary Note 8]

In the substrate processing apparatus of Supplementary Note 1, wherein if an external storage device is removed from the attachment/detachment part without pressing the predetermined button, the fact is displayed on the manipulation screen.

What is claimed is:

1. A substrate processing apparatus comprising:
a controller configured to control display of a manipulation screen through which substrate processing information is manipulated; and
an attachment/detachment part to which a removable external storage device is attached,
wherein the manipulation screen comprises an initial screen with at least a login button, a login screen displaying an authentication operation when the login button is pressed, a setup screen displayed when the authentication operation is performed and a maintenance screen displayed when a setup button is pressed,
wherein, when the setup screen for writing the substrate processing information in the external storage device is displayed by pressing a predetermined button displayed on the maintenance screen, the controller lists the substrate processing information on the setup screen and displays a button indicating the external storage device is attached to the attachment/detachment part on the manipulation screen,
wherein, when the external storage device is not attached to the attachment/detachment part, the controller disables a button indicating the external storage device is attached to the attachment/detachment part,
wherein, when the external storage device is attached to the attachment/detachment part, the controller enables a button indicating the external storage device is attached to the attachment/detachment part, and
wherein, when the substrate processing information displayed on the setup screen is selected, the controller outputs a selected substrate processing information to the external storage device.

2. The substrate processing apparatus of claim 1, wherein an error message is generated when the button indicating the external storage device is attached to the attachment/detachment part is pressed to remove the external storage device from the attachment/detachment part before the substrate processing information is completely outputted to the external storage device.

3. The substrate processing apparatus of claim 1,
wherein the manipulation screen comprises: a title panel always displayed at an upper region of the manipulation screen; an information panel for controlling or monitoring a task; and a navigation panel at a lower region of the manipulation screen where navigation buttons are disposed,
wherein the button indicating the external storage device is attached to the attachment/detachment part and the setup screen are displayed on a same manipulation screen,
wherein the predetermined button is disposed on the navigation panel, and
wherein the setup screen is displayed on the information panel.

4. A substrate processing apparatus comprising a controller connected to:
a manipulation unit configured to provide a manipulation screen through which a file is prepared or edited to process a substrate; and
an attachment/detachment part to which an external storage device is attached to store a data generated when the file is executed, the controller being connected to the manipulation unit and the attachment/detachment part through communication lines and being configured to execute the file,
wherein the manipulation unit configures the manipulation screen at least with a title panel always displayed at an upper region of the manipulation screen; an information panel for controlling or monitoring a task; and a navigation panel at a lower region of the manipulation screen, the navigation panel being unchanged even when a screen switching manipulation is carried out,
wherein a button indicating the external storage device is attached to the attachment/detachment part is disposed on the navigation panel,
wherein, when the external storage device is not attached to the attachment/detachment part, the controller disables the button indicating the external storage device is attached to the attachment/detachment part by displaying the button indicating the external storage device is attached to the attachment/detachment part in a color same as that of a background on the navigation panel, and
wherein, when the external storage device is attached to the attachment/detachment part, the controller displays the button indicating the external storage device is attached to the attachment/detachment part on the navigation panel and displays on the information panel a setup screen listing the data to be written to the external storage device.

5. The substrate processing apparatus of claim 4, wherein an error message is generated when the button indicating the external storage device is attached to the attachment/detachment part is pressed to remove the external storage device from the attachment/detachment part before the data is completely outputted to the external storage device.

6. A display method for a substrate processing apparatus, the substrate processing apparatus comprising a controller configured to control display of a manipulation screen through which substrate processing information is manipulated, and an attachment/detachment part to which a removable external storage device is attached, the substrate processing apparatus being capable of displaying the manipulation screen comprising a title panel always displayed at an upper region of the manipulation screen, an information panel for controlling or monitoring a task, and a navigation panel at a lower region of the manipulation screen where navigation buttons are disposed, the method comprising:
when the external storage device is not attached to the attachment/detachment part, disabling a navigation button indicating the external storage device is attached to the attachment/detachment part by displaying the navigation button in a color same as that of a background on the manipulation screen; and
when the external storage device is attached to the attachment/detachment part, enabling the navigation button indicating the external storage device is attached to the attachment/detachment part on the navigation panel by displaying the button on the navigation panel and displaying on the information panel a setup screen listing the data to be written to the external storage device.

7. A method for controlling a substrate processing apparatus comprising a controller configured to control a display of a manipulation screen through which substrate processing information is manipulated; and an attachment/detachment part to which a removable external storage device is attached, the method comprising:
configuring the manipulation screen with at least a title panel always displayed at an upper region of the manipulation screen; an information panel for controlling or monitoring a task; and a navigation panel at a lower region of the manipulation screen where navigation buttons are disposed;
enabling a navigation button indicating the external storage device is attached to the attachment/detachment part by displaying the button on the navigation panel when the external storage device is attached to the attachment/detachment part, and displaying on the information panel a setup screen listing a substrate processing information to be written to the external storage device, and outputting a selected substrate processing information to the external storage device; and
disabling the navigation button indicating the external storage device is attached to the attachment/detachment part by displaying the button in a color same as that of a background when the external storage device is not attached to the attachment/detachment part.

8. The substrate processing apparatus of claim 1, wherein the external storage device comprises a USB flash memory, an output means including a printer, or an input means including a keyboard or a mouse.

9. The substrate processing apparatus of claim 1, wherein attachment/detachment part comprises a USB port.

10. The display method of claim 6, further comprising displaying an alert screen on the manipulation screen when the external storage device is removed without pressing the button.

11. The substrate processing apparatus of claim 1, wherein the button indicating the external storage device is attached to the attachment/detachment part is disabled even when the external storage device is attached to the attachment/detachment part during a processing of the substrate by the substrate processing apparatus.

12. The substrate processing apparatus of one of claim 4, wherein the button indicating the external storage device is attached to the attachment/detachment part is disabled even when the external storage device is attached to the attachment/detachment part during a processing of the substrate by the substrate processing apparatus.

13. The substrate processing apparatus according to claim 1, wherein the substrate processing information comprises at least one of a production information indicating past process states of the apparatus, a failure information indicating states of the apparatus when a failure occurs, a trace data, a key logging data, an event logging data and error logging data.

14. The substrate processing apparatus according to claim 2, wherein the substrate processing information comprises at least one of a production information indicating past process states of the apparatus, a failure information indicating states of the apparatus when a failure occurs, a trace data, a key logging data, an event logging data and error logging data.

* * * * *